United States Patent

[11] 3,628,329

| [72] | Inventor | William R. Spencer |
| | | Cincinnati, Ohio |
| [21] | Appl. No. | 13,628 |
| [22] | Filed | Feb. 24, 1970 |
| [45] | Patented | Dec. 21, 1971 |
| [73] | Assignee | General Electric Company |

[54] GAS TURBINE ENGINE INLET GUIDE VANE ACTUATOR WITH AUTOMATIC RESET
11 Claims, 4 Drawing Figs.

[52] U.S. Cl. .................................................. 60/39.29,
  73/343, 137/65, 137/90, 137/457, 137/468
[51] Int. Cl. .............................................. F02c 9/02
[50] Field of Search .................................... 60/39.29,
  23, 26, 27, 28 T; 73/343; 137/468, 90, 65, 457

[56] References Cited
UNITED STATES PATENTS

| 2,980,065 | 4/1961 | Werts ........................... | 60/39.28 |
| 3,048,012 | 8/1962 | Slatter .......................... | 60/39.28 |
| 3,377,799 | 4/1968 | Geyer ........................... | 60/39.29 |

*Primary Examiner*—Clarence R. Gordon
*Attorneys*—Derek P. Lawrence, Thomas J. Bird, Jr., Lee H. Sachs, Frank L. Neuhauser, Oscar B. Waddell and Joseph B. Forman

ABSTRACT: An actuator is described which positions an element upon sensing a parameter and, after a certain time limit has elapsed, automatically repositions the element to its initial position. A central solid rod is surrounded by a thin perforated sleeve constructed of material having the same coefficient of expansion as the rod. The rod and sleeve are rigidly interconnected at one end, and hot gas is passed in a swirling manner along the axis of the actuator. The time differential expansion of the two members is utilized to initially position and then reposition a controlled element.

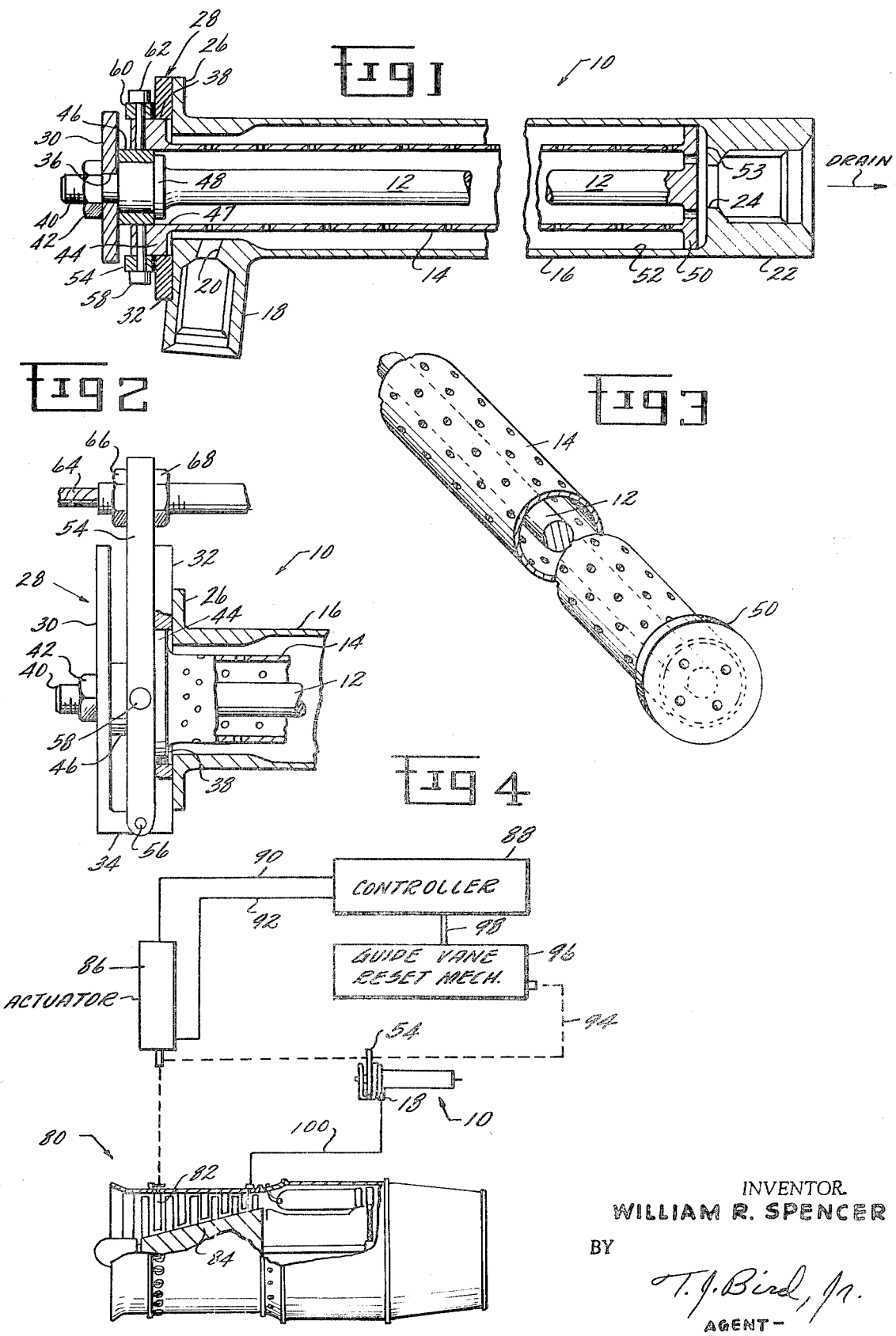

GAS TURBINE ENGINE INLET GUIDE VANE ACTUATOR WITH AUTOMATIC RESET

This invention relates generally to actuators and, more particularly, to an actuator which provides a fixed time delay before automatically setting a controlled member back to an initial position from which it has been previously displaced by the actuator.

It is a common goal in the design of high-performance gas turbine engines to provide for optimization of the performance of their axial flow compressors under various operating conditions. One method of achieving this end is to provide these compressors with a series of variable angle stator or guide vanes. During normal engine operation the angle of these vanes is adjusted according to a predetermined schedule, in accordance with speed, thrust, etc., to optimize the compressor performance.

In addition to optimizing compressor performance, the opening of these guide vanes or stator vanes may be utilized to set the inlet temperature seen by a turbine which is located downstream of the compressor and which drives the same. In doing so, particular attention is given to avoiding a condition known as compressor "stall."

An axial flow compressor is normally made up of a series of rotating airfoils called rotor blades and a stationary set of airfoils called stator vanes. Air entering the compressor flows in through a row of inlet guide vanes (IGVs) and is directed thereby into the first stage rotor blades. The air flow striking the rotor blades does so at an angle caused by both the position of the inlet guide vanes and also the effects of the rotation of the rotor blades. The air flow through the rotor blades is similar to the air flow action over an aircraft wing. That is, air flowing over the airfoil sets up a low-pressure zone while air flow under the airfoil sets up a high-pressure zone (due to Bernoulli's action). As the air passes through the rotor blades, it moves from the low-pressure zone into the high-pressure zone where it is compressed slightly and also given an increase in velocity. The air flow that leaves the rotor blades strikes the stator vanes as a combination of two motions (flow and rotor) similar to that entering the rotor blades. Again, as the air passes through the stator vane it sets up a low- and high-pressure zone on the stator airfoils and is again compressed slightly. The air then passes into a second stage, and the above action is repeated throughout the axial length of the compressor.

The amount of air flow will depend upon the size of the low-pressure zone on the leading edge of the first stage rotor blades. This series of low-pressure zones provides a pulling action that draws air into the engine. Also, the air is pulled into the next stage and throughout the compressor by the low-pressure zone on each stage of rotor blades. The angle at which the air flow strikes the rotor blade or the stator vane is called the airfoil angle of attack. If this angle is low, the pressure zones are correspondingly low and the air flow and compression ratio of the compressor will be low. If the angle is high, the pressure zones are high and air flow and compression ratio are correspondingly high.

If for some reason the angle of attack becomes too high, however, the airfoil will "stall." That is, the air flow over the upper foil surface will become turbulent and destroy the pressure zones. This will, of course, decrease the compression ratio and air flow. During sea level operation of a gas turbine engine, the primary reason for compressor stall is choking. If the engine speed is decreased from the design speed, the compression ratio will decrease with the lower rotor velocity. With a decrease in compression, the volume of air in the rear of the compressor will be greater. This excess volume of air causes a choking action in the rear of the compressor with a corresponding decrease in air flow. This decreases the velocity of the air in the front of the compressor and increases the tendency to stall. Some corrective action must therefore be taken to prevent stall at lower engine speeds.

The most commonly used method of preventing compressor stall today is the provision of variable angle of attack stator vanes in the front of the compressor. In this manner, the angles of attack of the stator vanes can be reset at lower angles for low engine speeds. The IGVs are also normally provided with a variable angle of attack. As a general rule, the positioning of the variable vanes is a function of corrected engine speed because the choking-stall condition is a function of corrected engine speed. That is, the variable vane will open with the engine speed and be fully open at maximum speed.

Another condition which may cause compressor stall is a throttle burst or engine acceleration. The normal manner of increasing thrust output from a gas turbine engine is to increase the amount of fuel delivered to the combustion system. The high fuel flow required to accelerate the engine results in an increase in combustion burner pressure. This, in turn, decreases the air flow at the rear of the compressor and can result in a choking-stall condition as described above. In order to eliminate this condition the angles of attack of the IGVs and stator vanes must be reset. If the angles of attack are not reset, upon reaching top speed the temperature of the gas entering the turbine will exceed the turbine design limit and can result in an appreciable decrease on engine turbine life. This turbine overtemperature problem can be cured by closing down the IGVs and stator vanes as discussed above. The turbine overtemperature, however, normally lasts for only a short period of time, e.g., 30 seconds. It is desirable, therefore, to provide an actuator which would reset the IGVs and stator vanes for this short period of time and thereafter would automatically reschedule the position of the vanes to their normal position. One method of doing this would be to add a time lag to a compressor inlet temperature sensor which sets the stator opening schedule. Another possible method of curing the problem would be to set a maximum fuel limit within the main fuel control system of the gas turbine engine. Both of the solutions, however, result in more complicated control mechanisms. Unfortunately, this results in more costly and less reliable controls.

SUMMARY OF THE INVENTION

It is an object of this invention, therefore, to provide a simple actuator which, after sensing a certain parameter, positions an element accordingly and, thereafter, repositions the element in its original position after a certain time limit.

It is a further object of this invention to provide an actuator for resetting aircraft gas turbine engine stator vanes with a change in compressor air temperature and thereafter repositioning the stator vanes in their original location after a certain time limit.

Briefly stated, the objects of this invention are carried out by providing an actuator which consists of a central solid rod, a concentric perforated sleeve formed of the same material surrounding the central solid rod and rigidly connected thereto at one end, and an outer thermal shield surrounding both inner members. Hot air is introduced tangentially at one end of the actuator to produce a helical pattern of air flow along the axis thereof. The temperature of the air causes a short time constant expansion of the perforated sleeve and a longer time constant expansion of the solid rod. Lever means are connected to the free end of the sleeve to position an element by the differential expansion of the two members. Additionally, means are provided for varying the time constants of the rod and sleeve.

DESCRIPTION OF THE DRAWING

While the specification concludes with a series of claims which particularly point out and distinctly claim the subject matter which Applicant regards as his invention, the above and other related objects and features of applicant's invention will be apparent from a reading of the following description of a preferred embodiment given in connection with the accompanying drawing, in which:

FIG. 1 is a side plan view, taken partly in section, of an actuator constructed in accordance with this invention;

FIG. 2 is a bottom plan view, with portions broken away, of the actuator of FIG. 1;

FIG. 3 is a perspective view of portions of the actuator of FIGS. 1 and 2; and

FIG. 4 is a schematic showing a gas turbine engine inlet guide vane control system in which the present invention is embodied.

DESCRIPTION OF A PREFERRED EMBODIMENT

Referring now to the drawings wherein like numerals correspond to like elements throughout, an actuator constructed in accordance with applicant's invention is shown in FIGS. 1 and 2 and is designated with the numeral 10. The actuator 10 is comprised basically of a solid rod 12, which is surrounded by a hollow perforated sleeve 14. The rod 12 and the sleeve 14 are, in turn, surrounded by a thermal shield 16, which is comprised of a generally hollow cylindrical rod.

The thermal shield 16 includes a fitting 18 located at one end thereof which cooperates with a radial inlet 20 to provide an opening for the passage of air to the interior of the actuator 10. The thermal shield 16 further includes a fitting 22 at its opposite end which cooperates with an axial opening 24 to provide a second passageway for the passage of air to the interior of the actuator 10. The purpose of these passageways will become apparent when the operation of the actuator is described.

The end of the thermal shield 16 which is opposite that provided with the fitting 22 is provided with a flange 26 which supports a U-shaped bracket 28. The U-shaped bracket 28 includes a pair of parallel legs 30 and 32 interconnected by a bight portion 34. The leg portions 30 and 32 are provided with openings 36 and 38 respectively, approximately midway along their lengths to receive one end of the solid rod 12. The free end of the rod 12 is provided with a threaded portion 40 in order that the actuator 10 may be rigidly connected to the bracket 28 by means of a nut 42.

The opening 38 in the leg 32 of the bracket 28 is sized so as to additionally receive a cylindrical, flanged end 44 of the perforated sleeve 14.

As clearly shown in FIG. 1, the solid rod 12 is provided with a Grapitor bearing and seal 46 which fits between the interior surface 47 of the flanged end 44 of the sleeve 14 and the exterior surface of the rod 12. The bearing and seal 46 is dimensioned such as to slidingly engage the inner peripheral surface 47 of the flange end 44 such that relative motion is permitted between the rod 12 and the flange end 44. The bearing and seal 46 is preferably of the type which permits this relative sliding motion while preventing the flow of fluid between the inner peripheral surface 47 and the bearing and seal 46. The bearing and seal 46 is restrained from axial movement along the rod 12 by means of a flange 48 formed as part of the rod 12. On its opposite end the bearing and seal is restrained by engagement with the leg portion 30 of the bracket 28.

Referring still to FIG. 1, the right-hand ends of the rod 12 and perforated sleeve 14 are interconnected and restrained from separate movement by means of a small flat plate 50. As shown, the flat plate 50 extends transversely to the rod 12, perforated sleeve 14, and thermal shield 16. The flat plate 50 is sized so as to fit within the thermal shield 16 in sliding relationship with an inner peripheral surface 52 of the thermal shield 16. As shown in FIG. 1, the flat plate 50 is axially spaced slightly from a flange 53, which forms the opening 24, in order to allow for thermal expansion of the rod 12 and the sleeve 14.

As is most clearly shown in FIG. 2, means are provided for coupling the output motion of the actuator 10 to an element whose position requires controlling. As shown, these means take the form of a simple lever 54 which is connected for pivotal movement to the bracket 28 by means of a pin 56. The actual position of the lever 54 is controlled by means of a second pin 58 which extends through the lever 54 and also through the flanged end 44 of the sleeve 14. A second lever 60, identical to the lever 54, is connected to the opposite side of the sleeve 14 by means of a pin 62.

Motion of the levers 54 and 60 is coupled to a cable 64, as shown in FIG. 2, by means of fittings 66 and 68 which are threadably connected to the cable 64 on either side of the levers 54 and 60. Thus, axial movement of the sleeve 14 results in axial movement of the cable 64 with the extent of movement of the cable 64 depending upon the length of the levers 54 and 60.

The axial movement of the sleeve 14 is provided as follows: hot air is directed to the interior of the actuator 10 through the opening 20 formed in the thermal shield 16. This hot air is provided with a swirling motion along the axial length of the actuator 10 due to the positioning of the radial opening 20. As the hot air passes over the thin, perforated sleeve 14 it causes thermal expansion thereof to occur. Due to the fact that the perforated sleeve 14 is rigidly connected to the flat plate 50 at its right end (FIG. 1), this thermal expansion will result in movement of the flanged end 44 to the left in FIG. 1. This leftward movement causes corresponding movement to the pins 58 and 62 and thus causes pivoting of the levers 54 and 60. This pivoting would be in a counterclockwise direction when viewed from the direction shown in FIG. 2. The pivoting would, in turn, result in leftward movement to the cable 64. The movement of the cable 64 could, of course, be coupled to any element, the position of which requires controlling.

As previously mentioned, the actuator 10 is designed to provide movement to an element upon the occurrence of some signal with an automatic resetting of the element after a certain time lapse. This resetting of the position of the cable 64 is provided as follows. The hot air entering the opening 20, in addition to causing expansion of the sleeve 14, also causes an increase in the temperature of the solid rod 12, prior to exiting through the opening 24 at the right end of the thermal shield 16. The solid rod 12 also expands due to this increase in temperature. As clearly shown in FIG. 1, however, the flange 48 of the solid rod 12 abuts the leg 30 of the bracket 28 (through the bearing and seal 46). Because of this, the solid rod 12 is constrained to expand to the right as shown in FIG. 1. This expansion of the solid rod 12 affects the position of the perforated sleeve 14, however, due to the interconnection of the two by means of the flat plate 50. That is, the rightward expansion of the solid rod 12 causes an equal rightward movement of the perforated sleeve 14.

As can be seen from the above description of the movements caused by the hot air passing through the actuator 10, the final position of the flanged end 44 of the perforated sleeve 14 is the summation of leftward movement caused by the expansion of the perforated sleeve 14 and the rightward movement caused by the expansion of the solid rod 12. Therefore, if the solid rod 12 and the perforated sleeve 14 are formed of the same material or of two materials having identical coefficients of expansion, the final position of the flanged end 44 will be identical to its initial position prior to the temperature influence of the hot air passing through the actuator 10.

As previously mentioned, due to the tangential positioning of the opening 20 the hot air is introduced in such a manner as to produce a helical pattern of air flow along the axis of the tubes. The helical pattern of air flow causes the perforated sleeve 14 to see a higher velocity of air than that seen by the solid rod 12 which is located near the axis of the actuator 10. As also previously mentioned, the perforated sleeve 14 is formed of a thin cross section, e.g., 20 mil thickness tubing. Due to this thin cross section, and further due to the high velocity hot air flowing over the periphery thereof, the perforated sleeve 14 will expand almost simultaneously with the introduction of the hot air to the actuator 10. Due to its greater thickness (relative to that of the perforated sleeve 14) and due to its position nearer the axis of the actuator 10, the solid rod 12 will have a much larger time lag before its thermal expansion takes place. Depending upon the relative thickness of the sleeve 14 and the overall diameter of the actuator 10, the time lag between the expansion of the perforated sleeve 14 and that of the solid rod 12 could vary anywhere from a few seconds to a couple of minutes. It is this difference in time lags between the expansion of the solid rod 12 and that of the perforated sleeve 14 which is utilized to automatically reposition the element at its initial position. As can be seen from the above description, Applicant has provided an extremely simple and yet totally reliable actuator for the stated purposes.

Referring now to FIG. 4, one possible use of applicant's actuator is shown in connection with an aircraft gas turbine engine 80. FIG. 4 illustrates in block diagram form those portions of a control system for the gas turbine engine 80 which are employed to regulate the position of compressor inlet guide vanes 82 (only one of which is shown) to optimize the operation of an axial flow compressor 84, normally employed in such a gas turbine engine. Pivoting the guide vanes about a radial axis in such a compressor is a well-known technique for controlling air flow in order to optimize compressor operation while at the same time preventing compressor failure due to compressor "stall."

The various guide vanes 82, usually arranged in several stages, are interconnected such that they may be simultaneously pivoted (again by known means) through a mechanical connection to an actuator 86. A controller 88 comprising a computer and, in part, a servomechanism establishes demand signals which feed hydraulic fluid through conduits 90 or 92 to displace the actuator 86 and to move the guide vanes 82 appropriately. A position feedback signal is provided by a mechanical connection 94 which generates an input to an integrator 96 having an output shaft 98. The output shaft 98 transmits the feedback signal to the controller 88 and nulls out the demand signal when the vanes 82 have been pivoted to their proper positions.

The above described system adequately provides for normal engine operation. There are certain conditions, however, that may result in compressor stall which cannot be conveniently provided for by the controller 88. One of these conditions might involve a throttle burst or engine acceleration where combustor pressures significantly increase. When such a condition exists, it is necessary that the guide vanes 82 be pivoted to a more closed position to reduce the flow of air into the compressor 84.

In order that such a compensation in the air intake may take place, an actuator 10 constructed in accordance with applicant's invention is provided in the feedback signal 94. The fitting 18 of the actuator 10 is connected by means of a pipe 100 to a source of hot air, e.g., one of the latter stages of the compressor 84. In this manner, an increase in the temperature of the air within the compressor 84 (an indication that compressor stall might occur) causes operation of the actuator 10 as described above. That is, the perforated sleeve 14 will expand due to the increase in temperature of the compressor air and will cause movement of the lever 54 which will result in repositioning of the feedback cable 94. This repositioning causes the controller 88 to activate the actuator 86 which, in turn, repositions the guide vanes 82 to a more closed position. After a short time lag, however, the expansion of the solid rod 12 of the actuator causes repositioning of the feedback cable 94 at its original position which, in turn, causes reopening of the guide vanes 82. In this manner, compressor stall due to the throttle burst or engine acceleration is prevented without the necessity of complicated electrical or electromechanical additions to the overall control system.

While a single embodiment of Applicant's actuator has been shown and described above, it should be obvious to those skilled in the art that certain changes could be made without departing from the broader aspects of Applicant's invention. For example, the levers 54 and 60 could easily be replaced by any other type of mechanical linkage system without detracting from the operation of the overall system. The U-shaped bracket 28 could be replaced with a flat plate to which the levers 54 would be connected and, further, to which the rod 12 would be bolted. In light of the above, these and other changes are intended to be covered by the appended claims which follow.

I claim:

1. A servo actuator comprising:
   a casing having an inlet and an outlet for the flow of fluid therethrough;
   a solid rod positioned within said casing;
   a perforated sleeve coaxially surrounding said rod, said sleeve being positioned between said rod and said casing;
   means for connecting a first end of said rod to a corresponding end of said sleeve;
   means for preventing the flow of fluid between a second end of said sleeve and a second end of said rod while permitting relative axial motion therebetween;
   means for restraining axial movement of said second end of said rod;
   means for delivering a hot fluid to the interior of said casing; and
   said rod and said sleeve being constructed of materials having substantially the same coefficients of thermal expansion whereby thermal expansion of said sleeve caused by said hot fluid will be equaled by thermal expansion of said rod after the occurrence of some finite time period.

2. A servo actuator as recited in claim 1 in combination with means for positioning a controllable element by the position of said second end of said sleeve.

3. A servo actuator as recited in claim 2 wherein said axial movement restraining means includes a bracket having an opening therein for receiving said second end of said rod and means for rigidly connecting said rod to said bracket.

4. A servo actuator as recited in claim 3 wherein said means for connecting said rod to said bracket include a flange formed on said rod intermediate said first and second ends, said second end of said rod including a threaded portion, said threaded portions extending through said bracket opening, and a nut for threadably connecting said rod to said bracket.

5. A servo actuator as recited in claim 4 wherein said element positioning means include a lever pivotally connected to said bracket, and means for connecting said lever to said second end of said sleeve.

6. A servo actuator as recited in claim 5 wherein said lever connecting means include a pin extending through said lever and further extending into an opening formed within said second end of said sleeve.

7. A servo actuator as recited in claim 6 wherein said inlet comprises a tangential opening formed within said casing adjacent one end thereof.

8. A servo actuator as recited in claim 7 wherein said outlet comprises an axial opening formed in the opposite end of said casing.

9. A servo actuator as recited in claim 8 wherein said fluid delivering means further include means for varying the amount of fluid delivered to said interior of said casing.

10. A servo actuator as recited in claim 2 in combination with an aircraft gas turbine engine including an axial flow compressor having variable stator vanes, said second end of said sleeve controlling the position of said variable stator vanes.

11. A servo actuator as recited in claim 10 wherein said hot fluid comprises air from said axial flow compressor.

* * * * *